US012463360B2

(12) United States Patent

Morita et al.

(10) Patent No.: US 12,463,360 B2

(45) Date of Patent: Nov. 4, 2025

(54) COMPACT RECEPTACLE CONNECTOR WITH IMPROVED CONNECTION RELIABILITY

(71) Applicant: Murata Manufacturing Co., Ltd., Kyoto-fu (JP)

(72) Inventors: Yuuto Morita, Nagaokakyo (JP); Yuma Amemori, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 387 days.

(21) Appl. No.: 18/150,071

(22) Filed: Jan. 4, 2023

(65) Prior Publication Data

US 2023/0246357 A1 Aug. 3, 2023

(30) Foreign Application Priority Data

Jan. 31, 2022 (JP) ................................ 2022-012631

(51) Int. Cl.
*H01R 12/71* (2011.01)

(52) U.S. Cl.
CPC ................................ *H01R 12/716* (2013.01)

(58) Field of Classification Search
CPC .... H01R 12/716; H01R 12/57; H01R 12/707; H01R 12/73; H01R 13/41; H01R 13/40; H01R 13/02; H01R 13/24; H01R 13/648
See application file for complete search history.

(56) References Cited

U.S. PATENT DOCUMENTS

| | | | | | |
|---|---|---|---|---|---|
| 9,391,398 | B2 * | 7/2016 | Omodachi | ........... | H01R 12/707 |
| 10,910,779 | B2 * | 2/2021 | Amemori | ........... | H01R 13/6592 |
| 2009/0305528 | A1 * | 12/2009 | Hirata | .................. | H01R 12/716 439/74 |
| 2013/0012039 | A1 * | 1/2013 | Nose | ...................... | H01R 12/73 439/74 |
| 2014/0377994 | A1 * | 12/2014 | Miyazaki | ............. | H01R 12/707 439/620.01 |
| 2016/0240944 | A1 * | 8/2016 | Kodaira | ............... | H01R 12/707 |
| 2016/0315430 | A1 * | 10/2016 | Takeuchi | ............. | H01R 12/707 |
| 2019/0140394 | A1 * | 5/2019 | Tanaka | ................. | H01R 12/727 |
| 2019/0363467 | A1 * | 11/2019 | Ko | ......................... | H01R 13/26 |
| 2020/0335893 | A1 * | 10/2020 | Chen | .................. | H01R 13/6585 |
| 2021/0194162 | A1 * | 6/2021 | Sugaya | ................ | H01R 13/639 |

FOREIGN PATENT DOCUMENTS

| | | |
|---|---|---|
| JP | 2021-057247 A | 4/2021 |

* cited by examiner

*Primary Examiner* — Abdullah A Riyami
*Assistant Examiner* — Nelson R. Burgos-Guntin
(74) *Attorney, Agent, or Firm* — Studebaker Brackett PLLC

(57) ABSTRACT

In a connector, a contact part is exposed from a resin body member at a surface facing in a rearward direction of the resin body member. The contact part is displaced in a forward direction when the contact part is pushed in the forward direction to cause the spring part to elastically deform. There is no other terminal between the contact part and an inclined surface. The contact part is located below the inclined surface.

13 Claims, 11 Drawing Sheets

COMPACT RECEPTACLE CONNECTOR WITH IMPROVED CONNECTION RELIABILITY

CROSS-REFERENCE TO RELATED APPLICATION

This application claims benefit of priority to Japanese Patent Application No. 2022-012631, filed Jan. 31, 2022, the entire content of which is incorporated herein by reference.

BACKGROUND

Technical Field

The present disclosure relates to a connector.

Background Art

For example, a socket described in Japanese Unexamined Patent Application Publication No. 2021-057247 is known as an disclosure related to an existing connector. The socket includes a shield member, a socket housing, and a plurality of socket terminal portions. When viewed in an up and down direction, the socket housing has a rectangular shape. The plurality of socket terminal portions is supported by the socket housing. The plurality of socket terminal portions is arranged in a right and left direction. A radio-frequency signal is input to and output from each of the plurality of socket terminal portions. When viewed in the up and down direction, the shield member has a rectangular shape along the outer edge of the socket housing. The shield member is connected to a ground potential.

The above socket is connected to a header. At this time, the shield member of the socket is connected to a shield member of the header.

Incidentally, in the socket described in Japanese Unexamined Patent Application Publication No. 2021-057247, there is a request to reduce the profile of a socket while suppressing a decrease in the reliability of connection between the shield members.

SUMMARY

The present disclosure provides a connector capable of reducing the profile of a connector while suppressing a decrease in the reliability of connection between terminals.

A connector according to an aspect of the present disclosure includes a resin body member, a first terminal supported by the resin body member, and a second terminal supported by the resin body member. The first terminal has an inclined surface. The inclined surface faces in a rear upper direction and is exposed from the resin body member. The second terminal includes a spring part extending in a right and left direction, a fixing part coupled to any one of a right end or a left end of the spring part and supported by the resin body member, and a contact part coupled to the other one of the right end and the left end of the spring part. The contact part is exposed from the resin body member at a surface facing in a rearward direction of the resin body member. The contact part is displaced in a forward direction when the contact part is pushed in the forward direction to cause the spring part to elastically deform. There is no other terminal between the contact part and the inclined surface. The contact part is located below the inclined surface.

Hereinafter, a positional relationship among members in the specification will be defined. A first member to a third member are components of a connector set. In the specification, the first member and the second member arranged in a front and rear direction represent the following state. This is a state where, when the first member and the second member are viewed in a direction perpendicular to the front and rear direction, both the first member and the second member are disposed on a selected straight line representing the front and rear direction. In the specification, the first member and the second member arranged in the front and rear direction when viewed in an up and down direction represent the following state. When the first member and the second member are viewed in the up and down direction, both the first member and the second member are disposed on a selected straight line representing the front and rear direction. In this case, when the first member and the second member are viewed in a right and left direction different from the up and down direction, any one of the first member and the second member does not need to be disposed on a selected straight line representing the front and rear direction. The first member and the second member may be in contact with each other. The first member and the second member may be separated from each other. The third member may be present between the first member and the second member. This definition also applies to directions other than the front and rear direction.

In the specification, a state where the first member is disposed on or over the second member means the following state. At least part of the first member is located just on or over the second member. Therefore, when viewed in the up and down direction, the first member overlaps the second member. This definition also applies to directions other than the up and down direction.

In the specification, a state where the first member is disposed on or above the second member includes a case where at least part of the first member is located just on or over the second member and a case where the first member is not located just on or over the second member and the first member is located obliquely above the second member. In this case, when viewed in the up and down direction, the first member does not need to overlap the second member. The term "obliquely above" includes, for example, upper left and upper right. This definition also applies to directions other than the up and down direction.

In the specification, unless otherwise specified, parts of the first member are defined as follows. A front part of the first member means a front half of the first member. A rear part of the first member means a rear half of the first member. A left part of the first member means a left half of the first member. A right part of the first member means a right half of the first member. An upper part of the first member means an upper half of the first member. A lower part of the first member means a lower half of the first member. A front end of the first member means a forward end of the first member. A rear end of the first member means a rearward end of the first member. A left end of the first member means a leftward end of the first member. A right end of the first member means a rightward end of the first member. An upper end of the first member means an upward end of the first member. A lower end of the first member means a downward end of the first member. A front end part of the first member means the front end of the first member and its neighborhood. A rear end part of the first member means the rear end of the first member and its neighborhood. A left end part of the first member means the left end of the first member and its neighborhood. A right end part of the first member means the right end of the first member and its neighborhood. An upper end part of the first member means the upper end of the first member and its neighborhood. A lower end part of the first member means the lower end of the first member and its neighborhood.

When selected two members in the specification are defined as the first member and the second member, the relationship between the selected two members means as follows. In the specification, a state where the first member is supported by the second member includes a case where the first member is attached to (that is, fixed to) the second member so as to be not movable with respect to the second member and a case where the first member is attached to the second member so as to be movable with respect to the second member. A state where the first member is supported by the second member includes both a case where the first member is directly attached to the second member and a case where the first member is attached to the second member with the third member interposed therebetween.

In the specification, a state where the first member is held by the second member includes a case where the first member is attached to (that is, fixed to) the second member so as to be not movable with respect to the second member and does not include a case where the first member is attached to the second member so as to be movable with respect to the second member. A state where the first member is held by the second member includes both a case where the first member is directly attached to the second member and a case where the first member is attached to the second member with the third member interposed therebetween.

In the specification, the phrase "the first member and the second member are electrically connected" means that the first member and the second member are electrically continuous. Therefore, the first member and the second member may be in contact with each other or the first member and the second member do not need to be in contact with each other. When the first member and the second member are not in contact with each other, the third member having electrical conductivity is disposed between the first member and the second member.

DETAILED DESCRIPTION

Figure 1:
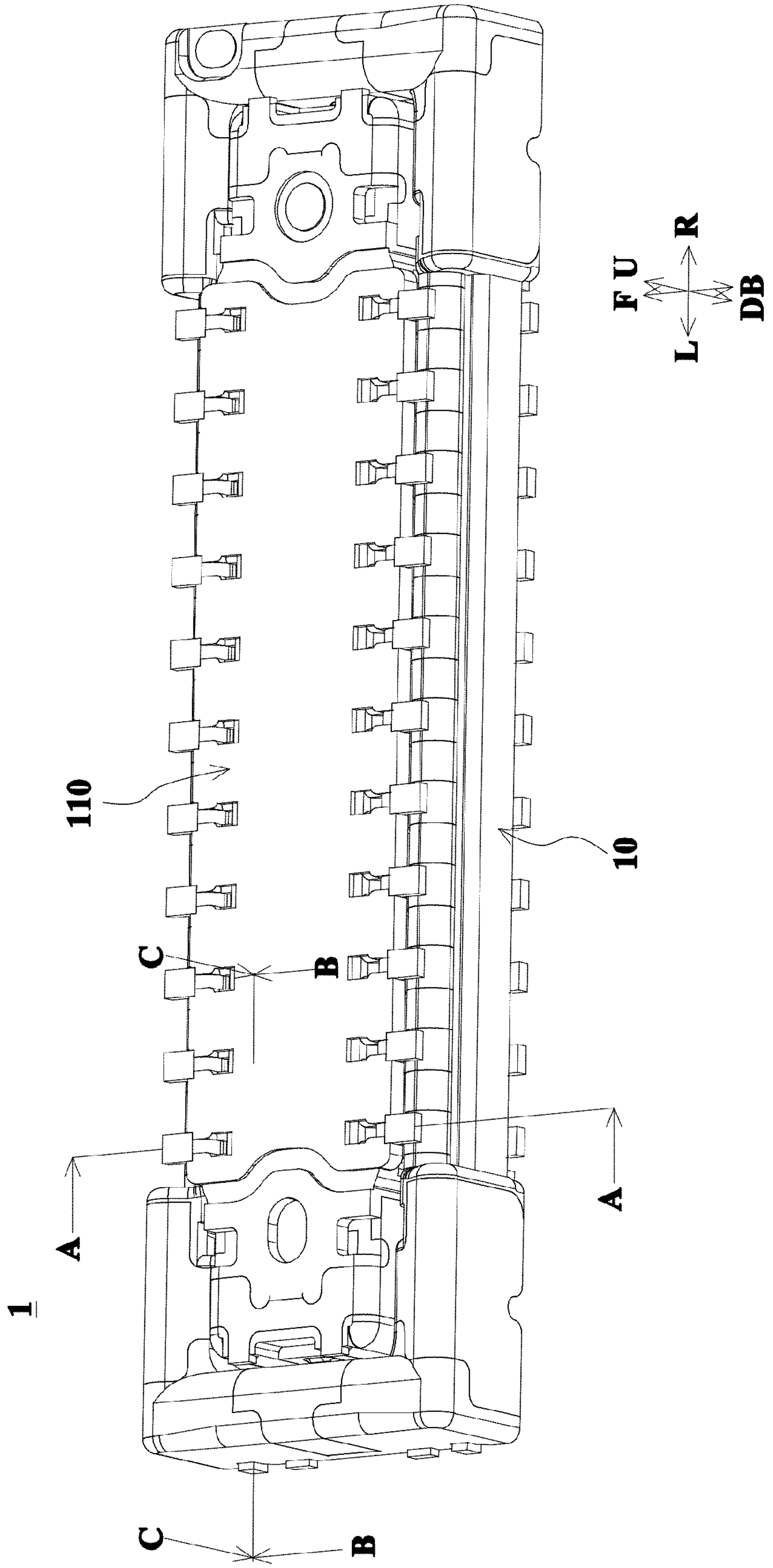
FIG. 1 is a perspective view of a connector set.

Hereinafter, a connector set 1 including a first connector 10 according to an embodiment of the present disclosure will be described. FIG. 1 is a perspective view of the connector set 1.

In the following description, as shown in FIG. 1, a direction in which a second connector 110 and the first connector 10 are arranged is defined as an up and down direction. A direction in which signal terminals 13*a* to 13*v* (see FIG. 2) are arranged in the first connector 10 is defined as a right and left direction. The right and left direction is orthogonal to the up and down direction. A direction orthogonal to the right and left direction and the up and down direction is defined as a front and rear direction. However, the up and down direction, the right and left direction, and the front and rear direction in the specification are directions defined for the sake of convenience of description and do not need to coincide with an up and down direction, a right and left direction, and a front and rear direction during use of the connector set 1. In each of the drawings, an upward direction and a downward direction may be interchanged, a rightward direction and a leftward direction may be interchanged, and a forward direction and a rearward direction may be interchanged.

The connector set 1 is, for example, used to connect two circuit boards. The connector set 1 includes the first connector 10 and the second connector 110. When the first connector 10 and the second connector 110 are connected, the second connector 110 is located on or over the first connector 10.

Structure of First Connector

Figure 2:
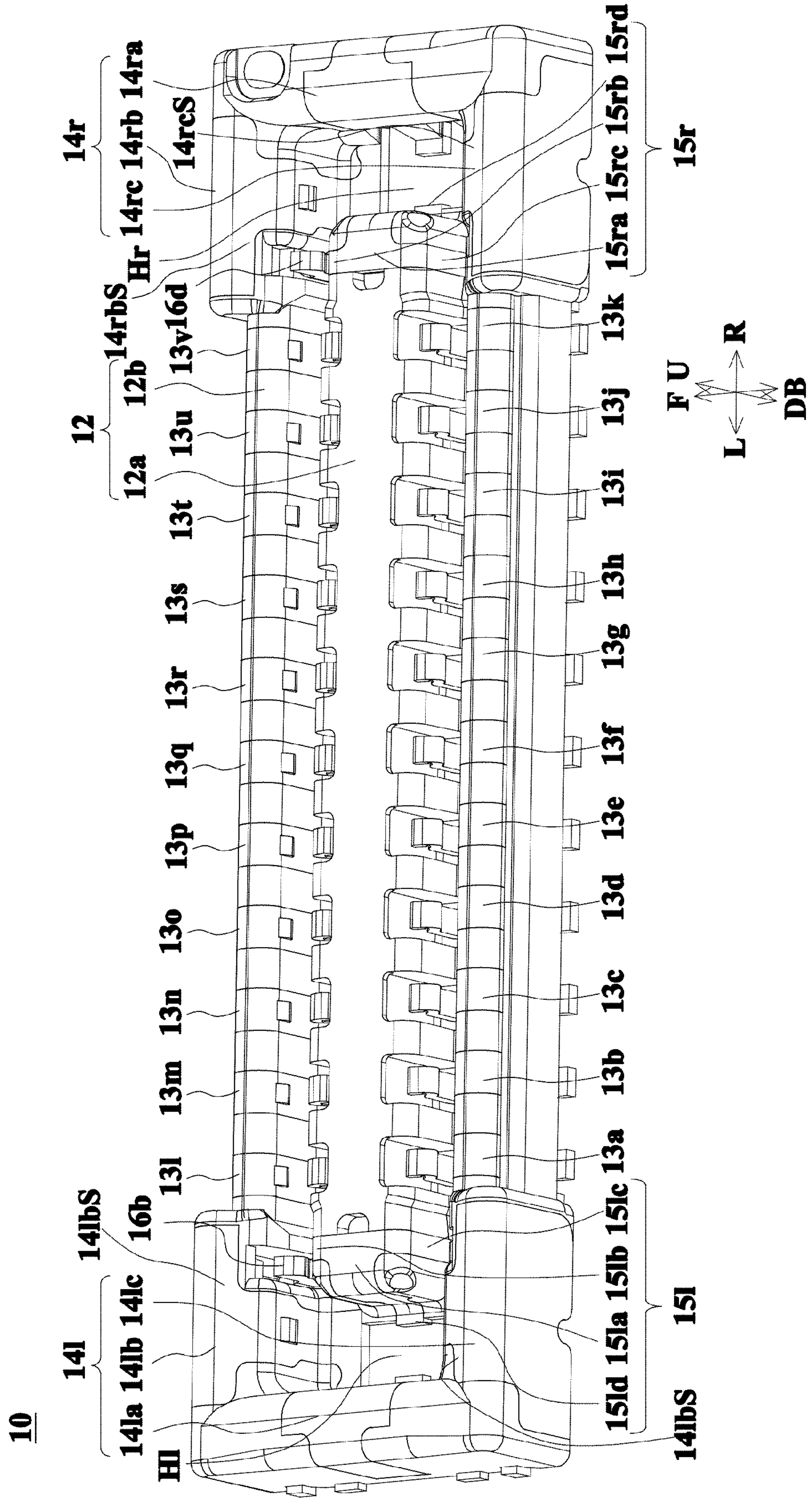
FIG. 2 is a perspective view of a first connector.
Figure 3:
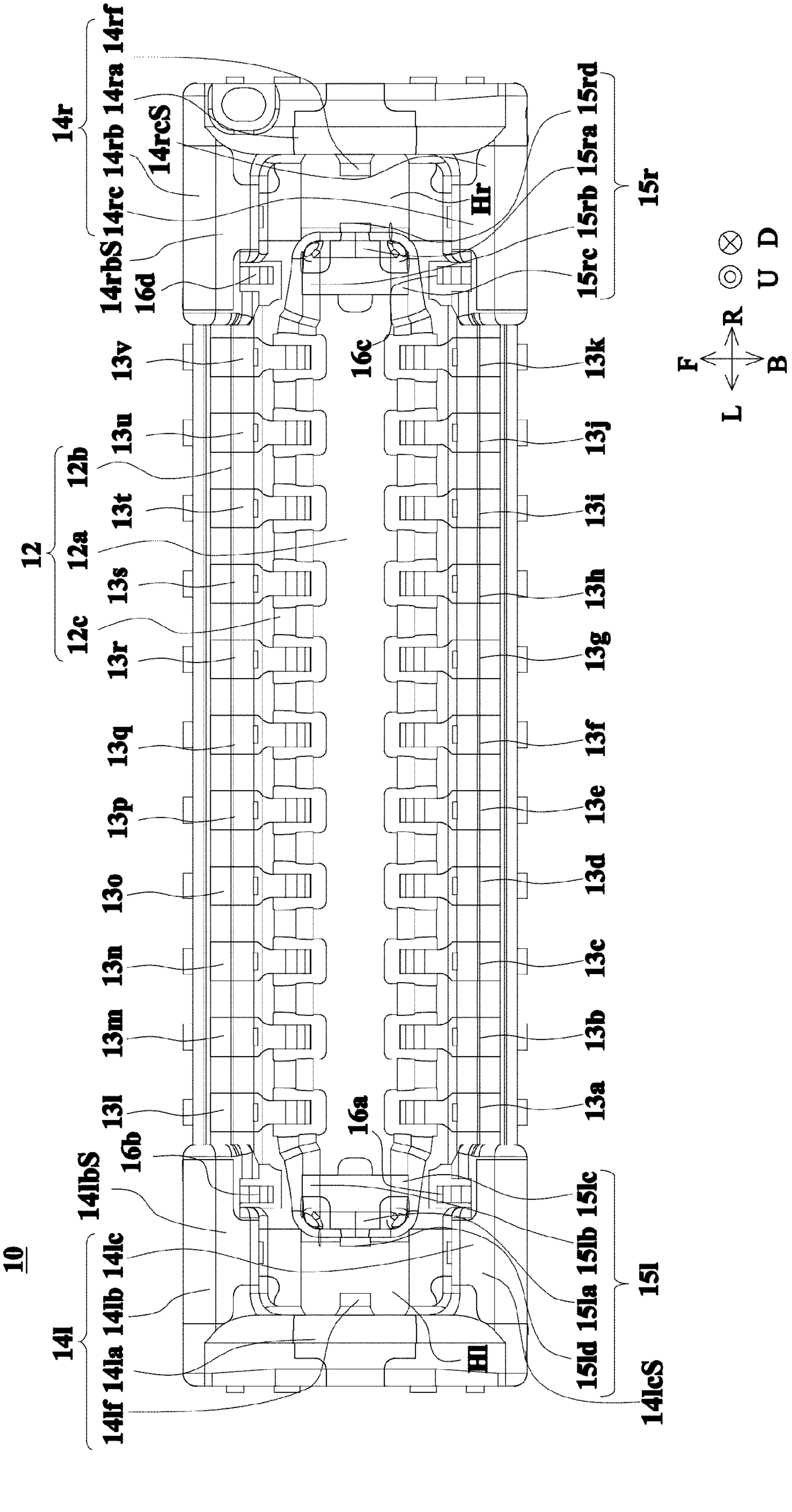
FIG. 3 is a top view of the first connector.
Figure 4:
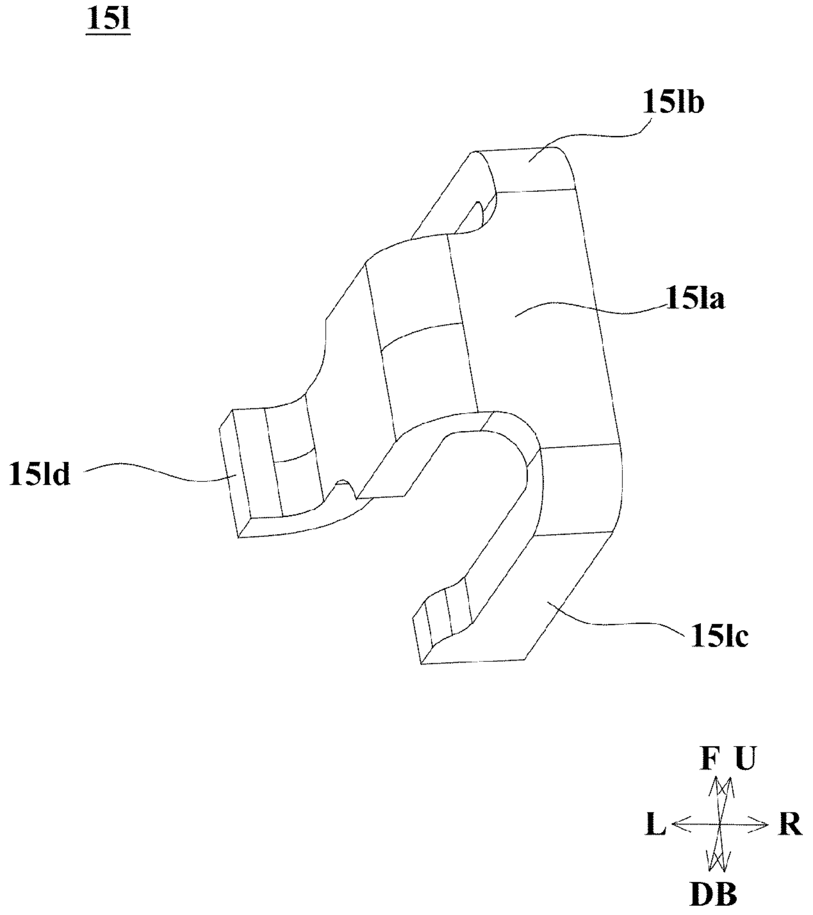
FIG. 4 is a perspective view of a floating terminal.
Figure 5:
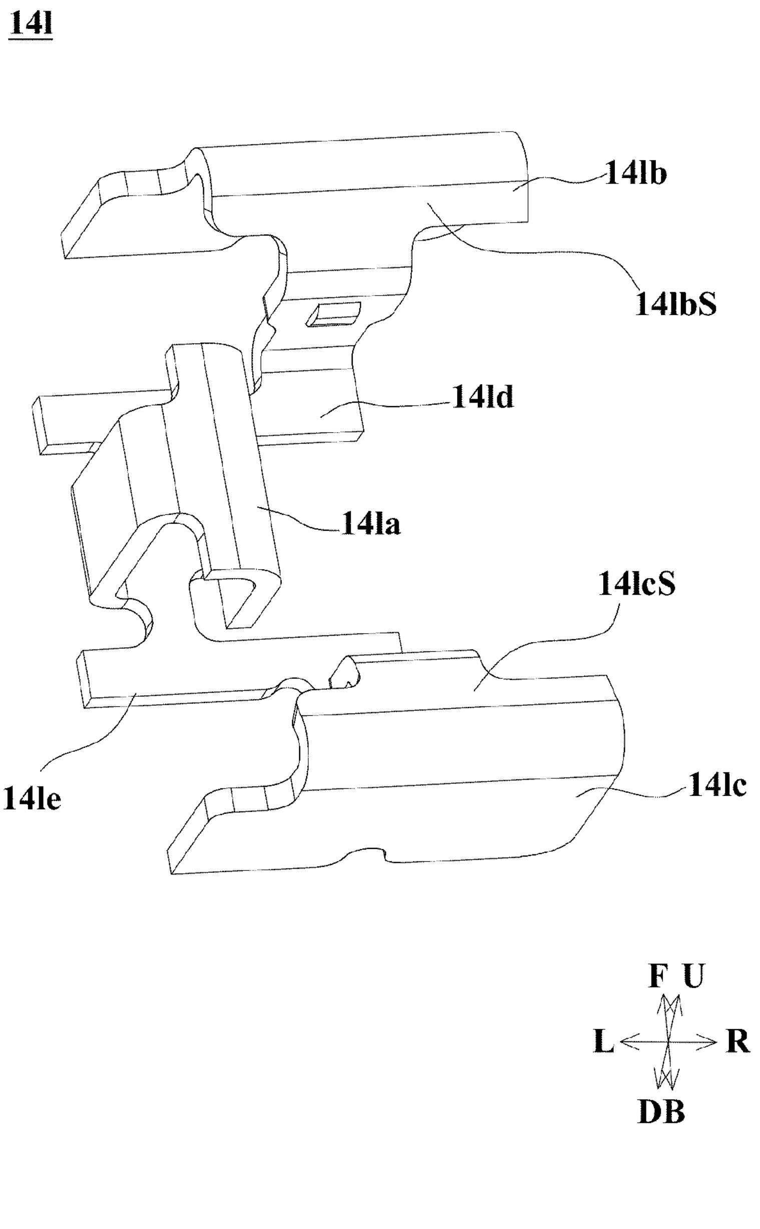
FIG. 5 is a perspective view of a ground terminal.
Figure 6:
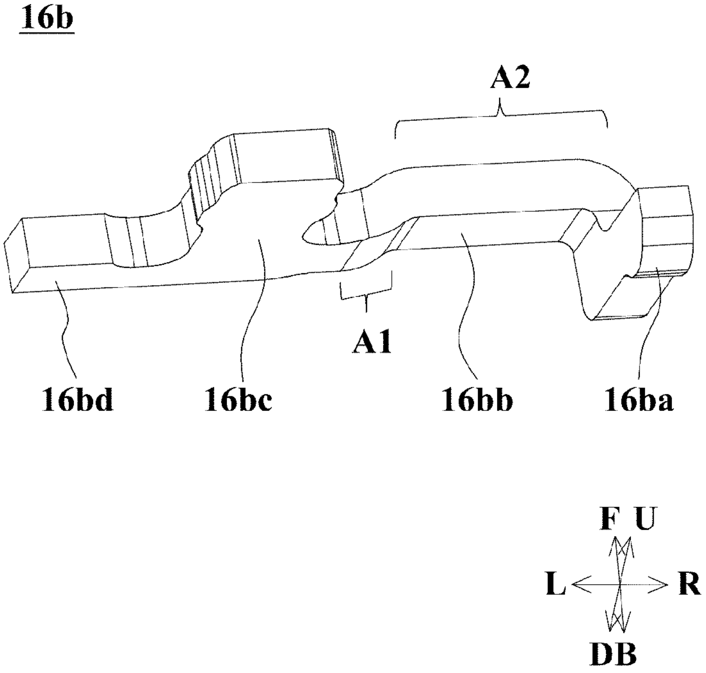
FIG. 6 is a perspective view of a ground terminal.
Figure 7:
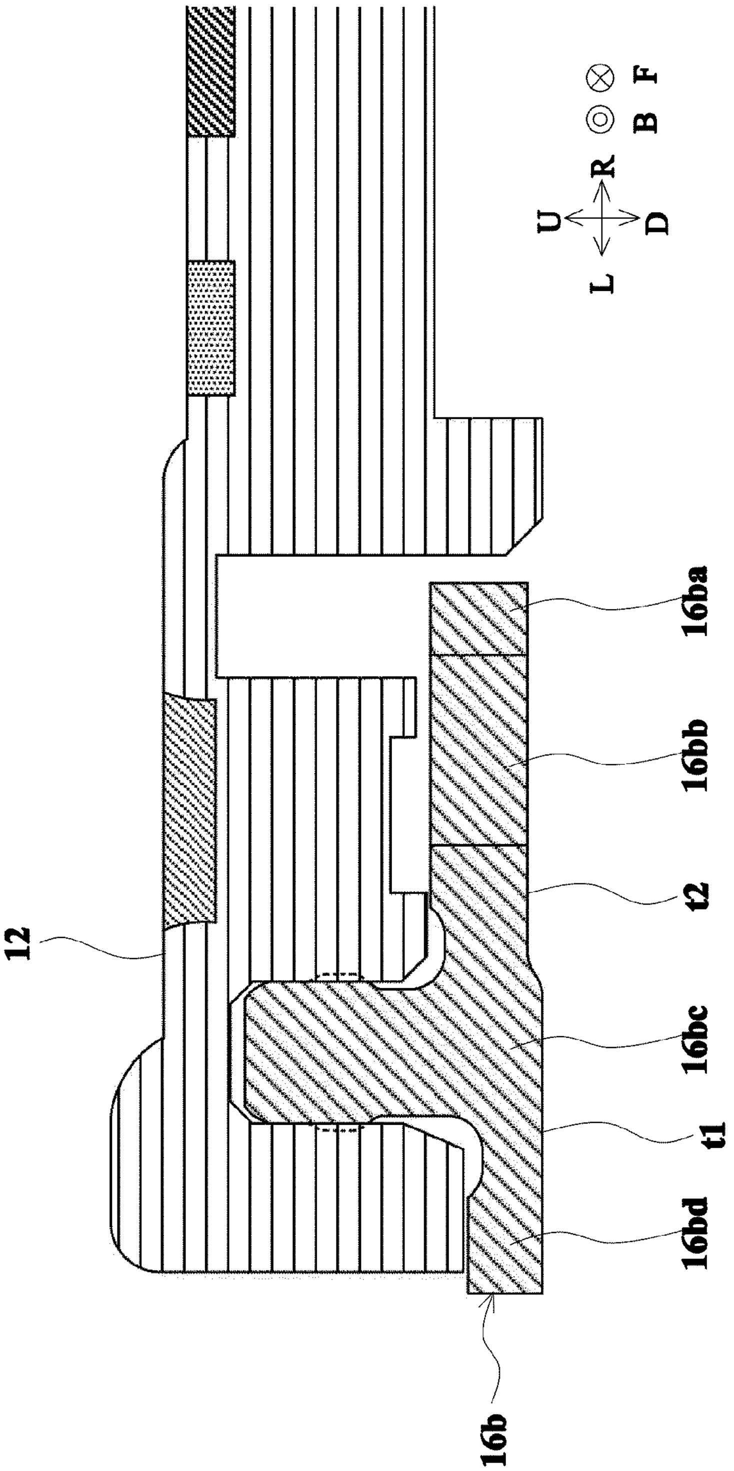
FIG. 7 is a cross-sectional view taken along the line B-B in FIG. 1.
Figure 8:
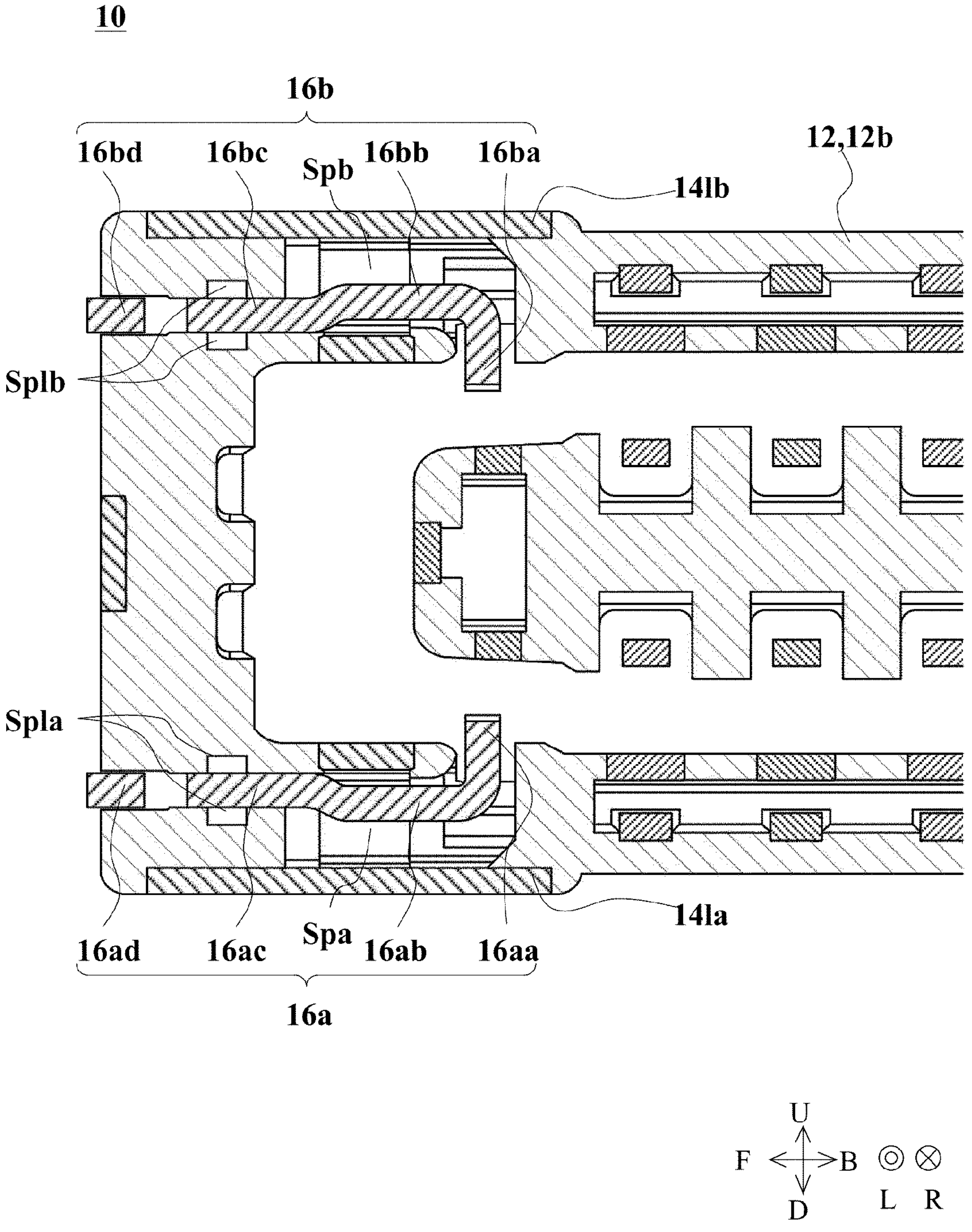
FIG. 8 is a cross-sectional view taken along the line C-C in FIG. 1

Next, the structure of the first connector 10 will be described. FIG. 2 is a perspective view of the first connector 10. FIG. 3 is a top view of the first connector 10. FIG. 4 is a perspective view of a floating terminal 15*l*. FIG. 5 is a perspective view of a ground terminal 14*l*. FIG. 6 is a perspective view of a ground terminal 16*b*. FIG. 7 is a cross-sectional view taken along the line B-B in FIG. 1. FIG. 8 is a cross-sectional view taken along the line C-C in FIG. 1.

As shown in FIGS. 2 and 3, the first connector 10 includes a resin body member 12, signal terminals 13*a* to 13*v*, ground terminals 14*l*, 14*r*, floating terminals 15*l*, 15*r*, and ground terminals 16*a* to 16*d*.

As shown in FIG. 2, the resin body member 12 includes a protruding portion 12*a*, a frame portion 12*b*, and a coupling portion 12*c* (see FIG. 3). When viewed in the up and down direction, the protruding portion 12*a* extends in the right and left direction. More specifically, the protruding portion 12*a* has a rectangular parallelepiped shape. When viewed in the up and down direction, the protruding portion 12*a* has two long sides extending in the right and left direction and two short sides extending in the front and rear direction.

When viewed in the up and down direction, the frame portion 12*b* has an annular shape surrounding the protruding portion 12*a*. The frame portion 12*b* has a front side and a rear side extending in the right and left direction and a right side and a left side extending in the front and rear direction. When viewed in the up and down direction, the protruding portion 12*a* is located in a region surrounded by the frame portion 12*b*. The protruding portion 12*a* is not in contact with the frame portion 12*b*.

As shown in FIG. 3, when viewed in the up and down direction, the coupling portion 12*c* is located between the protruding portion 12*a* and the frame portion 12*b* and couples the protruding portion 12*a* to the frame portion 12*b*. In the present embodiment, the coupling portion 12*c* couples the lower part of the protruding portion 12*a* to the lower part of the frame portion 12*b*. The material of the resin body member 12 is an electrically insulating material. The material of the resin body member 12 is, for example, a resin.

A radio-frequency signal is input to and output from each of the signal terminals 13*a* to 13*v*. The signal terminals 13*a* to 13*v* are supported by the resin body member 12. More specifically, part of each of the signal terminals 13*a* to 13*k* is embedded in the rear side of the frame portion 12*b*. Thus, the signal terminals 13*a* to 13*k* are supported by the frame portion 12*b* so as to be arranged in the right and left direction in a region in back of the protruding portion 12*a*. The signal terminals 13*a* to 13*k* are arranged in a line in this order from the left to the right. Part of each of the signal terminals 13*l* to 13*v* is embedded in the front side of the frame portion 12*b*. The signal terminals 13*l* to 13*v* are supported by the frame portion 12*b* so as to be arranged in the right and left direction in a region in front of the protruding portion 12*a*. The signal terminals 13*l* to 13*v* are respectively located in front of the signal terminals 13*a* to 13*k*. The signal terminals 13*l* to 13*v* are arranged in a line in this order from the left to the right. Each of the signal terminals 13*a* to 13*k* is manufactured by bending a rod metal member. The material of the signal terminals 13*a* to 13*k* is, for example, a copper-based material, such as phosphor bronze.

The floating terminal 15*l* is not connected to any of the terminals of the first connector 10, including the signal terminals 13*a* to 13*v* and the ground terminals 14*l*, 14*r* (details will be described later). Therefore, the potential of the floating terminal 15*l* is a floating potential. The floating terminal 15*l* is supported by the resin body member 12. As shown in FIGS. 2 and 3, when viewed in the up and down direction, the floating terminal 15*l* covers at least part of the left end of the protruding portion 12*a*. As shown in FIG. 4, the floating terminal 15*l* includes a first part 15*la*, a second part 15*lb*, a third part 15*lc*, and a floating protrusion 15*ld*. The first part 15*la* covers part of the left end of the top surface of the protruding portion 12*a* and part of the left surface of the protruding portion 12*a*. The second part 15*lb* extends in the forward direction from the first part 15*la*. The second part 15*lb* covers part of the left end of the front surface of the protruding portion 12*a*. The third part 15*lc* extends in the rearward direction from the first part 15*la*. The third part 15*lc* covers part of the left end of the rear surface of the protruding portion 12*a*. The floating protrusion 15*ld* extends in the leftward direction from the lower end of the first part 15*la*. The floating terminal 15*l* is manufactured by bending a metal member. The material of the floating terminal 15*l* is, for example, a copper-based material, such as phosphor bronze. The structure of the floating terminal 15*r* and the structure of the floating terminal 15*l* are bilaterally symmetrical, so the description of the structure of the floating terminal 15*r* is omitted.

The ground terminal 14*l* is connected to a ground potential. The ground terminal 14*l* (first terminal) is supported by the resin body member 12. Specifically, the ground terminal 14*l* is supported by the left side, the front side, and the rear side of the frame portion 12*b*. However, when viewed in the up and down direction, the left front corner portion and the left rear corner portion of the frame portion 12*b* are not covered with the ground terminal 14*l*. The ground terminal 14*l* is supported by the frame portion 12*b* so as to be opposed to the floating terminal 15*l* in the front and rear direction and in the right and left direction. Hereinafter, the structure of the ground terminal 14*l* will be described.

As shown in FIG. 5, the ground terminal 14*l* includes a first part 14*la*, a second part 14*lb*, a third part 14*lc*, connecting parts 14*ld*, 14*le*, and a ground protrusion 14*lf* (see FIGS. 2 and 3). The first part 14*la* is provided on the left surface, the top surface, and the right surface of the left side of the frame portion 12*b*. As shown in FIG. 2, part of the first part 14*la* is embedded in the left side of the frame portion 12*b*. Thus, the first part 14*la* is opposed to the floating terminal 15*l* in the right and left direction.

The second part 14*lb* is provided on the front surface, the top surface, and the rear surface of the left end of the front side of the frame portion 12*b*. Part of the second part 14*lb* is embedded in the front side of the frame portion 12*b*. Thus, the second part 14*lb* is opposed to the floating terminal 15*l* in the front and rear direction. The third part 14*lc* is provided on the front surface, the top surface, and the rear surface of the left end of the rear side of the frame portion 12*b*. Part of the third part 14*lc* is embedded in the rear side of the frame portion 12*b*. Thus, the third part 14*lc* is opposed to the floating terminal 15*l* in the front and rear direction.

The connecting part 14*ld* couples the first part 14*la* to the second part 14*lb*. The connecting part 14*le* couples the first part 14*la* to the third part 14*lc*. The ground protrusion 14*lf* extends in the rightward direction from the lower end of the first part 14*la*.

The above ground terminal 14*l* (first terminal) has inclined surfaces 14*lb*S, 14*lc*S. The inclined surface 14*lb*S is provided on part of the top surface and part of the rear surface of the front side of the resin body member 12. The inclined surface 14*lb*S faces in a rear upper direction. The inclined surface 14*lb*S is exposed from the resin body member 12. In the present embodiment, the inclined surface 14*lb*S is exposed from the front side of the resin body member 12. The inclined surface 14*lc*S is provided on part of the top surface and part of the front surface of the rear side of the resin body member 12. The inclined surface 14*lc*S faces in a front upper direction. The inclined surface 14*lc*S is exposed from the resin body member 12. In the present embodiment, the inclined surface 14*lc*S is exposed from the rear side of the resin body member 12. The structure of the ground terminal 14*r* and the structure of the ground terminal 14*l* are bilaterally symmetrical, so the description of the structure of the ground terminal 14*r* is omitted. Each of the ground terminals 14*l*, 14*r* is manufactured by bending a metal member. The material of the ground terminals 14*l*, 14*r* is, for example, a copper-based material, such as phosphor bronze.

The ground terminal 16*b* is connected to a ground potential. The ground terminal 16*b* (second terminal) is supported by the resin body member 12. In the present embodiment, the ground terminal 16*b* is supported by the left front part of the resin body member 12. When viewed in the front and rear direction, the ground terminal 16*b* overlaps the second part 14*lb* of the ground terminal 14*l*. As shown in FIG. 6, the ground terminal 16*b* (second terminal) includes a contact part 16*ba*, a spring part 16*bb*, a fixing part 16*bc*, and an external connecting part 16*bd*.

As shown in FIG. 6, the spring part 16*bb* extends in the right and left direction. The spring part 16*bb* includes a curved section A1 curved from the fixing part 16*bc* (described later) in the forward direction and a straight section A2 extending in the rightward direction from the curved section A1. The spring part 16*bb* is not supported by the resin body member 12. As shown in FIG. 8, the front surface of the spring part 16*bb* is not in contact with the resin body member 12. In other words, a gap Spb is present in front of the front surface of the spring part 16*bb*. Thus, the spring part 16*bb* is elastically deformable so as to deflect in the front and rear direction. The size of the spring part 16*bb* in the front and rear direction is smaller than the size of the spring part 16*bb* in the up and down direction such that the spring part 16*bb* is deformable in the front and rear direction.

As shown in FIG. 6, the fixing part 16*bc* is coupled to the left end of the spring part 16*bb*. The fixing part 16*bc* protrudes in the upward direction from the left end of the spring part 16*bb*. The fixing part 16*bc* is embedded in the frame portion 12*b*. Thus, the fixing part 16*bc* is supported by the resin body member 12. However, as shown in FIG. 8, part of the front surface and part of the rear surface of the lower end of the fixing part 16*bc* are not in contact with the resin body member 12. In other words, a gap Splb is present in front of the front surface of the lower end of the fixing part 16*bc*. Similarly, a gap Splb is present in back of the rear surface of the lower end of the fixing part 16*bc*. In addition, as shown in FIG. 7, a lower end t1 of the fixing part 16*bc* is located below a lower end t2 of the spring part 16*bb*, as shown in FIG. 7.

As shown in FIG. 6, the contact part 16*ba* is coupled to the right end of the spring part 16*bb*. The contact part 16*ba* extends in the rearward direction from the right end of the spring part 16*bb*. Thus, as shown in FIG. 2, the contact part 16*ba* is exposed from the resin body member 12 at a surface facing in the rearward direction of the resin body member 12. In the present embodiment, the contact part 16*ba* is exposed from the resin body member 12 at the rear surface of the front side of the frame portion 12*b*. The contact part 16*ba* is located below the inclined surface 14*lb*S. In the present embodiment, the contact part 16*ba* is located below and on the right side of the inclined surface 14*lb*S. The contact part 16*ba* is located near the inclined surface 14*lb*S. Therefore, there is no other terminal between the contact part 16*ba* and the inclined surface 14*lb*S.

The external connecting part 16*bd* extends in the leftward direction from the fixing part 16*bc*. The fixing part 16*bc* and the external connecting part 16*bd* are parts to which solder is applied when the first connector 10 is mounted on the circuit board.

In the above ground terminal 16*b*, the contact part 16*ba* can be displaced in the forward direction when the contact part 16*ba* is pushed in the forward direction to cause the spring part 16*bb* to elastically deform. The ground terminal 16*b* is manufactured by bending a metal member. The material of the ground terminal 16*b* is, for example, a copper-based material, such as phosphor bronze. The structure of the ground terminal 16*a* and the structure of the ground terminal 16*b* are symmetrical in the front and back, so the description of the structure of the ground terminal 16*a* is omitted. The structure of the ground terminal 16*d* and the structure of the ground terminal 16*b* are bilaterally symmetrical, so the description of the structure of the ground terminal 16*d* is omitted. The structure of the ground terminal 16*c* and the structure of the ground terminal 16*a* are bilaterally symmetrical, so the description of the structure of the ground terminal 16*c* is omitted.

As shown in FIG. 3, in the first connector 10 as described above, when viewed in the up and down direction, a through-hole Hl extending through the coupling portion 12*c* in the up and down direction is provided in at least part of a region between the first part 14*la* and the floating terminal 15*l*. When viewed in the up and down direction, the ground protrusion 14*lf* protrudes into the through-hole Hl. When viewed in the up and down direction, the floating protrusion 15*ld* protrudes into the through-hole Hl. The ground protrusion 14*lf* and the floating protrusion 15*ld* are arranged in the right and left direction. The structure of a through-hole Hr and the structure of the through-hole Hl are bilaterally symmetrical, so the description of the structure of the through-hole Hr is omitted.

In the above first connector 10, the first connector 10 is mounted on a first circuit board (not shown) such that the bottom surface of the resin body member 12 is opposed to the first circuit board. Specifically, parts of the signal terminals 13*a* to 13*v*, ground terminals 14*l*, 14*r*, floating terminals 15*l*, 15*r*, and ground terminals 16*a* to 16*d* are exposed from the bottom surface of the resin body member 12. Solder is applied to each of these parts. Thus, the signal terminals 13*a* to 13*v*, the ground terminals 14*l*, 14*r*, the floating terminals 15*l*, 15*r*, and the ground terminals 16*a* to 16*d* are respectively connected to the electrodes of the first circuit board.

Structure of Second Connector

Figure 9:
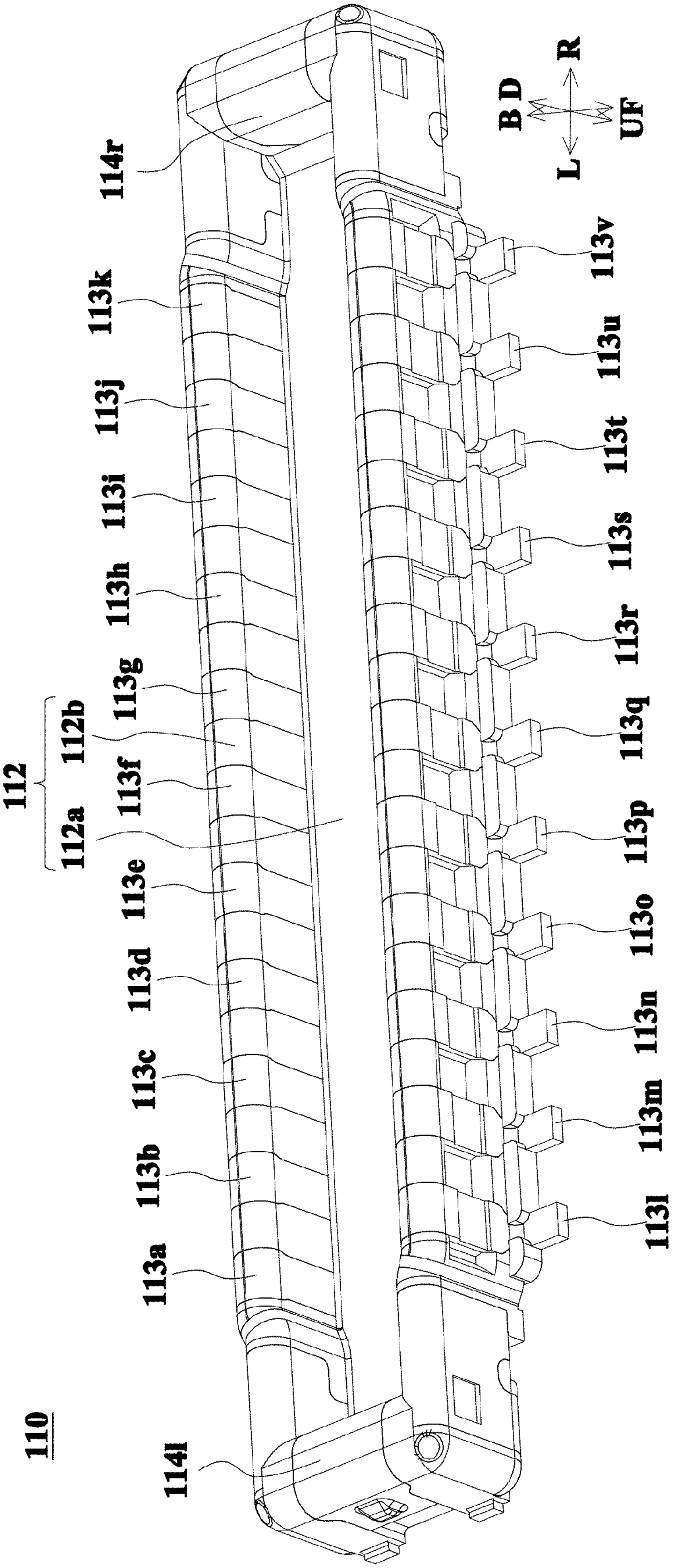
FIG. 9 is a perspective view of a second connector.

Next, the structure of the second connector 110 will be described. FIG. 9 is a perspective view of the second connector 110.

As shown in FIG. 9, the second connector 110 includes a resin body member 112, signal terminals 113*a* to 113*v*, and ground terminals 114*l*, 114*r*.

The resin body member 112 includes a bottom portion 112*a* and a frame portion 112*b*. When viewed in the up and down direction, the frame portion 112*b* has an annular shape. More specifically, when viewed in the up and down direction, the frame portion 112*b* has a rectangular outer edge and a rectangular inner edge. When viewed in the up and down direction, each of the outer edge of the frame portion 112*b* and the inner edge of the frame portion 112*b* has two long sides extending in the right and left direction and two short sides extending in the front and rear direction. As shown in FIG. 9, when viewed in the up and down direction, the bottom portion 112*a* closes the top surface of a region surrounded by the frame portion 112*b*. The material of the resin body member 112 is an electrically insulating material. The material of the resin body member 112 is, for example, a resin.

A radio-frequency signal is input to and output from each of the signal terminals 113*a* to 113*v*. The signal terminals 113*a* to 113*v* are supported by the resin body member 112. More specifically, part of each of the signal terminals 113*a* to 113*k* is embedded in the rear side of the frame portion 112*b*. The signal terminals 113*a* to 113*k* are arranged in a line in this order from the left to the right. Part of each of the signal terminals 113*l* to 113*v* is embedded in the front side of the frame portion 112*b*. The signal terminals 113*l* to 113*v* are respectively located in front of the signal terminals 113*a* to 113*k*. The signal terminals 113*l* to 113*v* are arranged in a line in this order from the left to the right. Each of the signal terminals 113*a* to 113*k* is manufactured by bending a rod metal member. The material of the signal terminals 113*a* to 113*k* is, for example, a copper-based material, such as phosphor bronze.

The ground terminal 114*l* is connected to a ground potential. The ground terminal 114*l* is supported by the resin body member 112. Part of the ground terminal 114*l* is embedded in the left end of the front side of the frame portion 112*b*, the left end of the rear side of the frame portion 112*b*, and the left side of the frame portion 112*b*. The ground terminal 114*l* is manufactured by bending a metal member. The material of the ground terminal 114*l* is, for example, a copper-based material, such as phosphor bronze. The structure of the ground terminal 114*r* and the structure of the ground terminal 114*l* are bilaterally symmetrical, so the description of the structure of the ground terminal 114*r* is omitted.

In the above second connector 110, the second connector 110 is mounted on a second circuit board (not shown) such that the top surface of the resin body member 112 is opposed to the second circuit board. Specifically, parts of the signal terminals 113*a* to 113*v* and ground terminals 114*l*, 114*r* are exposed from the top surface of the resin body member 112. Solder is applied to each of these parts. Thus, the signal terminals 113*a* to 113*v* and the ground terminals 114*l*, 114*r* are respectively connected to the electrodes of the second circuit board.

Structure of Connector Set

Figure 10:
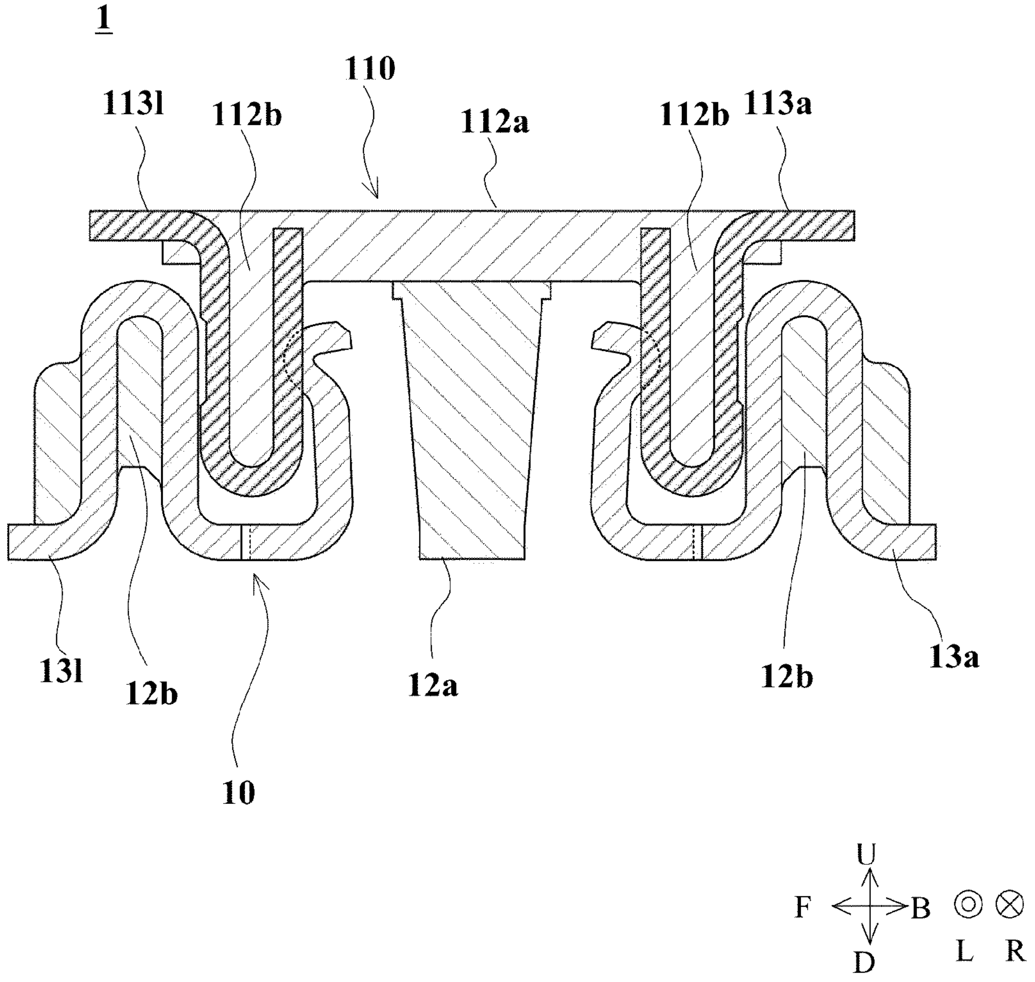
FIG. 10 is a cross-sectional view taken along the line A-A in FIG. 1.

Next, the structure of the connector set 1 will be described. FIG. 10 is a cross-sectional view taken along the line A-A in FIG. 1.

As shown in FIGS. 1 and 8, the frame portion 112*b* of the second connector 110 is inserted in a region surrounded by the frame portion 12*b* of the first connector 10. At this time, the protruding portion 12*a* of the first connector 10 is inserted in a region surrounded by the frame portion 112*b* of the second connector 110. Thus, the signal terminals 13*a* to 13*v* respectively contact with the signal terminals 113*a* to 113*v*. The ground terminals 14*l*, 14*r* respectively contact with the ground terminals 114*l*, 114*r*. At this time, the ground terminals 114*l*, 114*r* respectively slide on the set of inclined surfaces 14*lb*S, 14*lc*S and the set of inclined surfaces 14*rb*S, 14*rc*S. Thus, the ground terminals 114*l*, 114*r* are guided to the ground terminals 14*l*, 14*r*. At this time, the ground terminals 16*a* to 16*d* elastically deform. The ground terminals 16*a*, 16*b* are in press-contact with the ground terminal 114*l*. The ground terminals 16*c*, 16*d* are in press-contact with the ground terminal 114*r*.

However, the floating terminals 15*l*, 15*r* do not contact with the signal terminals 113*a* to 113*v* or the ground terminals 114*l*, 114*r*. Thus, in a state where the second connector 110 is connected to the first connector 10 as well, the potential of each of the floating terminals 15*l*, 15*r* remains at a floating potential.

Advantageous Effects

With the first connector 10, the profile of the first connector 10 is reduced while a decrease in the reliability of connection between the ground terminal 16*b* and the ground terminal 114*l* is suppressed. Hereinafter, a first connector 10 that does not include the ground terminals 16*a* to 16*d* is assumed as a first connector according to a comparative example. In the first connector according to the comparative example, if the profile of the first connector is reduced, the height of the ground terminal 14*l* in the up and down direction reduces. In this case, the ground terminal 14*l* is difficult to deform. Therefore, in connecting the first connector according to the comparative example with the second connector 110, even when the ground terminal 114*l* contacts with the ground terminal 14*l*, the ground terminal 14*l* does not sufficiently elastically deform. Thus, it is difficult to reliably connect the ground terminal 14*l* with the ground terminal 114*l*.

In the first connector 10, the ground terminal 14*l* has the inclined surface 14*lb*S. The inclined surface 14*lb*S faces in the rear upper direction and is exposed from the resin body member 12. The inclined surface 14*lb*S is located below the contact part 16*ba*. Thus, the ground terminal 114*l* contacts with the inclined surface 14*lb*S before contacting with the contact part 16*ba*. The ground terminal 114*l* slides on the inclined surface 14*lb*S and is aligned with the ground terminal 14*l*. After that, as the ground terminal 114*l* goes down, the ground terminal 114*l* contacts with the contact part 16*ba*. As a result, the contact part 16*ba* is pushed in the forward direction by the ground terminal 114*l* to cause the spring part 16*bb* to elastically deform. Thus, the contact part 16*ba* is displaced in the forward direction. However, the ground terminal 14*l* does not deform. As described above, in the first connector 10, the ground terminal 14*l* provides a guide function, and the ground terminal 16*b* provides a press-contact function. Therefore, in the first connector 10, even when the height of the ground terminal 14*l* in the up and down direction reduces and, as a result, the ground terminal 14*l* is less likely to deform, reliable connection between the ground terminal 114*l* and each of the ground terminals 14*l*, 16*b* is less likely to be impaired. Since the ground terminal 16*b* is in press-contact with the ground terminal 114*l*, reliable connection between the ground terminal 16*b* and the ground terminal 114*l* is less likely to decrease. In addition, the ground terminal 16*b* includes the spring part 16*bb* extending in the right and left direction. For this reason, the height of the ground terminal 16*b* in the up and down direction is low. Therefore, the profile of the first connector 10 is reduced.

In the first connector 10, the lower end t1 of the fixing part 16*bc* is located below the lower end t2 of the spring part 16*bb*. Thus, in mounting the first connector 10 on a circuit board, application of solder to the spring part 16*bb* is suppressed. As a result, fixing of the spring part 16*bb* to the circuit board with solder interposed therebetween is suppressed, so the elastic deformation of the spring part 16*bb* is not impaired.

With the first connector 10, spreading of solder to an unnecessary part is suppressed. More specifically, part of the front surface and part of the rear surface of the lower end of the fixing part 16*bc* are not in contact with the resin body member 12. In other words, as shown in FIG. 8, the gap Splb is present in front of the front surface of the lower end of the fixing part 16*bc*. Similarly, the gap Splb is present in back of the rear surface of the lower end of the fixing part 16*bc*. Thus, a surplus amount (hereinafter, surplus solder) of solder applied to the bottom surface of the fixing part 16*bc* is collected in the gaps Splb. Therefore, spreading of surplus solder to the spring part 16*bb* is suppressed. As described above, with the first connector 10, spreading of solder to an unnecessary part is suppressed.

With the first connector 10, the front surface of the spring part 16*bb* is not in contact with the resin body member 12. Thus, the spring part 16*bb* is elastically deformable so as to deflect in the forward direction.

With the first connector 10, the size of the first connector 10 is reduced while a decrease in the reliability of connection between the ground terminal 16*b* and the ground terminal 114*l* is suppressed. More specifically, the spring part 16*bb* includes the curved section A1 curved from the fixing part 16*bc* in the forward direction and the straight section A2 extending in the rightward direction from the curved section A1. Thus, the length of the spring part 16*bb* is extended while an increase in the length of the spring part 16*bb* in the right and left direction is suppressed. In other words, the spring part 16*bb* more easily elastically deforms while an increase in the length of the spring part 16*bb* in the right and left direction is suppressed. The size of the first connector 10 is reduced while a decrease in the reliability of connection between the ground terminal 16*b* and the ground terminal 114*l* is suppressed.

Modification

Figure 11:
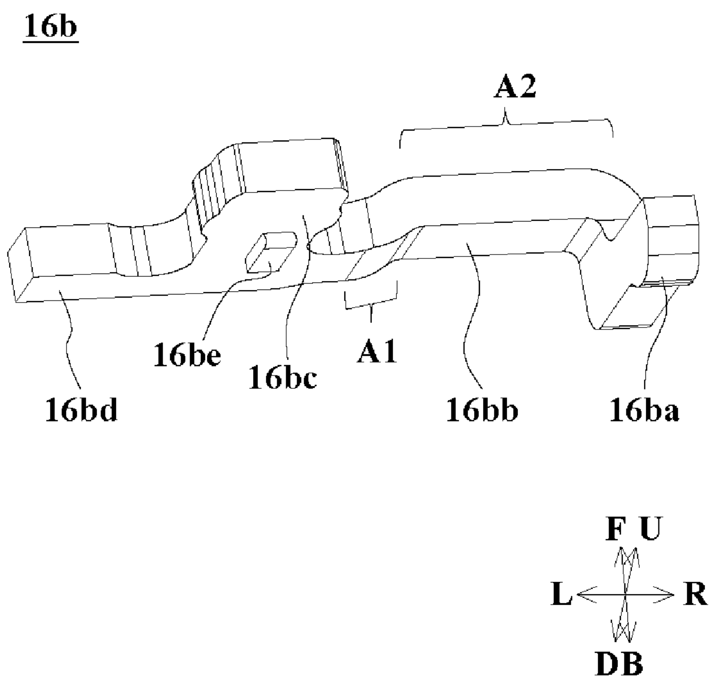
FIG. 11 is a perspective view of a ground terminal according to a modification.

Hereinafter, the ground terminal 16*d* according to a modification will be described. FIG. 11 is a perspective view of the ground terminal 16*d* according to the modification.

A protrusion 16*be* is provided on the fixing part 16*bc* of the ground terminal 16*d*. The protrusion 16*be* protrudes in the rearward direction from the fixing part 16*bc*. Thus, when the ground terminal 16*d* is press-fitted to the resin body member 12, the protrusion 16*be* hooks on the resin body member 12 to firmly fix the ground terminal 16*d* to the resin body member 12.

With the protrusion 16*be*, when the ground terminal 16*d* is press-fitted to the resin body member 12, the resin body member 12 receives a force in the front and rear direction. Thus, the longitudinal direction of the resin body member 12 is the right and left direction. Therefore, warpage of the resin body member 12 in the longitudinal direction is suppressed.

OTHER EMBODIMENTS

The connector according to the present disclosure is not limited to the first connector 10 and may be changed within the scope of the purport of the present disclosure.

In the specification, the annular shape is not limited to a complete ring and includes a partially cut-out ring. However, in the annular shape, the ratio of the cut-out part to the ring is lower than or equal to 20%.

As in the case of the ground terminal 16*d* (second terminal), the fixing part may be coupled to the right end of the spring part, and the contact part may be coupled to the left end of the spring part. At this time, the spring part includes a curved section curved in the forward direction from the fixing part and a straight section extending in the leftward direction from the curved section.

Part of the front surface or part of the rear surface of the lower end of the fixing part 16*bc* does not need to be in contact with the resin body member 12. In other words, a gap just needs to be present in front of part of the front surface or in back of part of the rear surface of the lower end of the fixing part 16*bc*.

The through-holes Hl, Hr do not need to be provided.

The ground protrusions 14*lf*, 14*rf* and the floating protrusions 15*ld*, 15*rd* are not indispensable components.

The floating terminals 15*l*, 15*r* may be connected to the electrodes of the circuit board or may be configured not to be connected to the electrodes of the circuit board.

The first connector 10 may include any one of the set of signal terminals 13*a* to 13*k* and the set of signal terminals 13*l* to 13*v*.

The first terminal and the second terminal may be terminals other than the ground terminals. The first terminal and the second terminal may be, for example, power supply terminals to which a power supply voltage is applied or signal terminals to which a radio-frequency signal is input to or output from.

The ground terminal 14*l* that is the first terminal and the ground terminal 16*b* that is the second terminal are in contact with the ground terminal 114*l* that is one terminal. However, the ground terminal 14*l* that is the first terminal and the ground terminal 16*b* that is the second terminal may be respectively in contact with different terminals.

The gaps Spb, Splb are not indispensable components.

What is claimed is:

1. A connector comprising:
a resin body member;
a first terminal supported by the resin body member; and
a second terminal supported by the resin body member, wherein
the first terminal has an inclined surface,
the inclined surface faces in a rear upper direction and is exposed from the resin body member,
the second terminal includes
a spring part extending in a right and left direction,
a fixing part coupled to any one of a right end and a left end of the spring part and supported by the resin body member, and
a contact part coupled to an other one of the right end and the left end of the spring part,
the contact part is exposed from the resin body member at a surface facing in a rearward direction of the resin body member,
the contact part is displaced in a forward direction when the contact part is pushed in the forward direction to cause the spring part to elastically deform,
when the contact part is in a neutral position, the contact part extends from the spring part from the position of the inclined surface in the forward direction to a position in the rearward direction relative to the inclined surface, and
there is no other terminal between the contact part and the inclined surface, and
the contact part is located below the inclined surface.

2. The connector according to claim 1, wherein
a lower end of the fixing part is located below a lower end of the spring part.

3. The connector according to claim 1, wherein
a gap is present at least one of:
in front of part of a front surface of a lower end of the fixing part, or
in back of part of a rear surface of the lower end of the fixing part.

4. The connector according to claim 1, wherein
a gap is present in front of a front surface of the spring part.

5. The connector according to claim 1, wherein
the spring part includes a curved section curved from the fixing part in a forward direction, and a straight section extending in a rightward direction or in a leftward direction from the curved section.

6. The connector according to claim 2, wherein
a gap is present at least one of:
in front of part of a front surface of a lower end of the fixing part, or
in back of part of a rear surface of the lower end of the fixing part.

7. The connector according to claim 2, wherein
a gap is present in front of a front surface of the spring part.

8. The connector according to claim 2, wherein
the spring part includes a curved section curved from the fixing part in a forward direction, and a straight section extending in a rightward direction or in a leftward direction from the curved section.

9. The connector according to claim 3, wherein
the spring part includes a curved section curved from the fixing part in a forward direction, and a straight section extending in a rightward direction or in a leftward direction from the curved section.

10. The connector according to claim 4, wherein
the spring part includes a curved section curved from the fixing part in a forward direction, and a straight section extending in a rightward direction or in a leftward direction from the curved section.

11. The connector according to claim 6, wherein
the spring part includes a curved section curved from the fixing part in a forward direction, and a straight section extending in a rightward direction or in a leftward direction from the curved section.

12. The connector according to claim 7, wherein
the spring part includes a curved section curved from the fixing part in a forward direction, and a straight section extending in a rightward direction or in a leftward direction from the curved section.

13. A connector comprising:
a resin body member;

a first terminal supported by the resin body member; and
a second terminal supported by the resin body member, wherein
the first terminal has an inclined surface,
the inclined surface faces in a rear upper direction and is exposed from the resin body member,
the second terminal includes
a spring part extending in a right and left direction,
a fixing part coupled to any one of a right end and a left end of the spring part and supported by the resin body member, and
a contact part coupled to an other one of the right end and the left end of the spring part,
an entirety of the spring part is disposed at a position of the inclined surface in a forward direction of the resin body member,
the contact part is exposed from the resin body member at a surface facing in a rearward direction of the resin body member,
the contact part is displaced in the forward direction when the contact part is pushed in the forward direction to cause the spring part to elastically deform,
there is no other terminal between the contact part and the inclined surface, and
the contact part is located below the inclined surface.

* * * * *